United States Patent
Dvorak et al.

(10) Patent No.: US 11,365,763 B2
(45) Date of Patent: Jun. 21, 2022

(54) COVER PLATE AND SEAL CARRIER THAT ELIMINATES BEARING ENDPLAY

(71) Applicant: DANFOSS POWER SOLUTIONS INC., Ames, IA (US)

(72) Inventors: Charlie Dvorak, Nordborg (DK); Wondimagegn Diress, Nordborg (DK); Pavol Baleo, Nordborg (DK); Jeffrey C. Hansell, Nordborg (DK)

(73) Assignee: Danfoss Power Solutions Inc., Ames, IA (US)

( * ) Notice: Subject to any disclaimer, the term of this patent is extended or adjusted under 35 U.S.C. 154(b) by 24 days.

(21) Appl. No.: 16/705,972

(22) Filed: Dec. 6, 2019

(65) Prior Publication Data

US 2020/0182294 A1    Jun. 11, 2020

Related U.S. Application Data

(60) Provisional application No. 62/776,014, filed on Dec. 6, 2018.

(51) Int. Cl.
| | |
|---|---|
| *F16C 35/07* | (2006.01) |
| *F16C 27/04* | (2006.01) |
| *F16C 33/78* | (2006.01) |
| *F16C 35/067* | (2006.01) |

(52) U.S. Cl.
CPC ............ *F16C 35/067* (2013.01); *F16C 27/04* (2013.01); *F16C 33/7886* (2013.01); *F16C 2360/42* (2013.01)

(58) Field of Classification Search
CPC .... F16C 35/067; F16C 35/077; F16C 25/083; F16C 19/364; F16C 19/383–388; F16B 21/10; H02K 5/15; H02K 5/16–165; H02K 5/173–1737; H02K 5/24; F04B 1/2085; F04B 1/122; F04B 53/16

See application file for complete search history.

(56) References Cited

U.S. PATENT DOCUMENTS

| | | | |
|---|---|---|---|
| 3,726,576 | A | 4/1973 | Bambrook et al. |
| 4,212,098 | A * | 7/1980 | Sand .................... F16C 35/077 |
| | | | 29/271 |
| 5,046,870 | A | 9/1991 | Ordo |

(Continued)

FOREIGN PATENT DOCUMENTS

| | | |
|---|---|---|
| CN | 101484716 B | 7/2009 |
| CN | 203983114 U | 12/2014 |

(Continued)

OTHER PUBLICATIONS

Machine Translation of WO 2010069715 (Year: 2010).*

(Continued)

*Primary Examiner* — Alan B Waits
(74) *Attorney, Agent, or Firm* — Zarley Law Firm P.L.C.

(57) ABSTRACT

A bearing attachment system for a pump product having a seal carrier and a cover plate. The attachment system is configured to produce a force deflection curve that provides a clamping force on a pair of tapered roller bearings such that a tight bearing endplay on the tapered roller bearings is maintained through a full range of manufacturing tolerances. The geometric shape of the cover plate and the top surface of the seal carrier provide the desired deflection characteristics.

15 Claims, 12 Drawing Sheets

(56) References Cited

U.S. PATENT DOCUMENTS

| | | | |
|---|---|---|---|
| 5,385,451 A | 1/1995 | Fujii et al. | |
| 5,386,630 A | 2/1995 | Fox | |
| 5,651,616 A | 7/1997 | Hustak et al. | |
| 6,409,390 B1 * | 6/2002 | Bouzakis | F16C 25/083 |
| | | | 384/517 |
| 8,075,196 B2 | 12/2011 | Burner et al. | |
| 9,115,754 B2 * | 8/2015 | Einbock | F16C 35/067 |
| 9,261,142 B2 * | 2/2016 | Mola | F16C 33/586 |
| 2002/0015643 A1 * | 2/2002 | Fiebing | F04B 1/2064 |
| | | | 417/222.1 |
| 2011/0220769 A1 * | 9/2011 | Einbock | F16C 35/067 |
| | | | 248/224.8 |
| 2013/0169092 A1 * | 7/2013 | Neuhaus | F16C 35/067 |
| | | | 310/90 |
| 2015/0275976 A1 * | 10/2015 | Tanaka | F16C 33/74 |
| | | | 384/2 |
| 2017/0204911 A1 * | 7/2017 | Ishibashi | F16C 35/067 |

FOREIGN PATENT DOCUMENTS

| | | | | |
|---|---|---|---|---|
| CN | 106460938 A | 2/2017 | | |
| CN | 207161522 U | 3/2018 | | |
| DE | 102012007996 A1 | 10/2013 | | |
| EP | 2035722 B1 | 11/2009 | | |
| JP | 2004217056 A | 8/2004 | | |
| JP | 2012189195 A * | 10/2012 | | F16C 35/067 |
| RU | 2268412 C1 | 1/2006 | | |
| WO | WO-03081750 A1 * | 10/2003 | | H02K 5/1732 |
| WO | WO-2010069715 A2 * | 6/2010 | | F16C 35/067 |

OTHER PUBLICATIONS

RU2268412 C1, Jan. 20, 2006, Zakrytoe aktsionernoe obshchestvo, English translation of Abstract.
Chinese First Office Action from the Chinese National Intellectual Property Administration; Chinese Appl No. 201911254340.6; Danfoss Power Solutions Inc.; dated Nov. 18, 2020.
English Translation—Chinese First Office Action.
Chinese Second Office Action from the Chinese National Intellectual Property Administration; Chinese Appl No. 201911254340.6; Danfoss Power Solutions Inc.; dated Jul. 2, 2021.
Chinese Second Office Action—English Translation.
CN106460938A—English Translation.

* cited by examiner

COVER PLATE AND SEAL CARRIER THAT ELIMINATES BEARING ENDPLAY

CROSS REFERENCE TO RELATED APPLICATION

This application claims the benefit of U.S. Provisional Patent Application No. 62/776,014 filed Dec. 6, 2018, the contents of which is hereby incorporated by reference in their entirety.

FIELD OF THE INVENTION

The present invention is directed to an attachment system for a pump product, including a hydraulic piston pump, having tapered roller bearings that provides a clamping force while also accommodating a full range of manufacturing tolerances.

BACKGROUND OF THE INVENTION

Pump products, including hydraulic pistons, generally include a housing, a swashplate, a pair of tapered roller bearings, a seal carrier, and a cover plate assembled to retain the tapered roller bearings. The tapered roller bearings are positioned to provide an induced thrust load in an axial direction to a shaft, held by the tapered roller bearings, when the shaft is under a radial load. To provide the induced thrust load, the tapered roller bearings are constrained by an attachment system that includes the seal carrier and the cover plate.

Obtaining endplay clearance where the tapered roller bearings provide a clamping force without causing undue wear on the tapered roller bearings is difficult to achieve. Controlling manufacturing tolerances for all parts to achieve acceptable endplay without adjustment is neither practical nor cost effective. Using reasonable manufacturing tolerances leaves bearing endplay in a condition that endplay is slightly tight (a press fit) or significantly loose (endplay clearance). One continuing problem in the art is to have a system that maintains a tight bearing endplay at all tolerance conditions, yet not being so tight that bearing life is not severely reduced.

A number of attempts have been made to solve this problem. In one example, as disclosed in U.S. Pat. No. 5,386,630, a bearing assembly is positioned to enable a hub to rotate on a spindle and has two single row tapered roller bearings. The bearing assembly is adjusted by forcing the inner races or cones together with a spacer between them, all while the hub is off the spindle. This force, which is applied by an adjusting tool that fits through the cones much like the spindle, compresses the spacer and causes it to yield both elastically and plastically. The force is applied incrementally, and with each incremental advance, the drag torque in the bearing assembly is checked by simply turning the adjusting tool. When the drag torque reached a prescribed magnitude, the compressive force is removed and the adjusting tool withdrawn. The two races, the collapsed spacer and the hub, are installed on the spindle nut over the end of the spindle. The spindle nut clamps the two races and the spacer together, with the spacer establishing the distance that the races are separated—and hence the setting for the bearing assembly.

In another example, as disclosed in U.S. Pat. No. 3,726,576, a bearing capable of carrying thrust loads is adjusted by positioning a spacer/washer against one of the bearing races and applying an axial load to that washer. The load is resisted by the bearing and is sufficient in magnitude to deform the washer first elastically and then plastically. The plastic deformation is such that upon removal of the axial load and recovery of the elastic deformation, the spacer will provide the desired endplay or preload adjustment for the bearing.

In yet another example, disclosed in EP2035722, a compensating bearing having tapered rollers organized in a row between tapered raceways, with the axial position of the rollers and the setting for the system, of which the bearing is a part, is controlled by a rib ring that is displaced from a normal operating position by a compensating ring having a high co-efficient of thermal expansion, so as to control the setting of the bearing.

Disclosed in RU2268412 is another example where a flexible member is mounted in front of an auxiliary bearing and bears on an outer race of the auxiliary bearing from the side of the axial pressure on a shaft directly, or via a stop on a pressing member from the side of a housing. The pressing member is connected with the housing so that the flexible member can be deformed. The flexible member is mounted for permitting the axial linear expansion of the members between the bearing face of the outer race of a main bearing and the surface of the pressing member of the flexible member.

While useful, these and other systems that utilize threaded adjustments, shimming, and conical disk springs, are time consuming, costly, and require additional package size. Accordingly, a need exists in the art for a system that addresses these problems and deficiencies.

A primary objective of the present system is to provide a cover plate and seal carrier that eliminate bearing endplay.

Another objective of the present invention is to provide a cover plate and seal carrier that permit a bearing assembly to have a clamping force and also accommodate for a full manufacturing tolerance range.

These and other objectives will be apparent to those of ordinary skill in the art based upon the following written description, drawings and claims.

SUMMARY OF THE INVENTION

The objectives are achieved through an attachment assembly for a pair of tapered roller bearings that produces a force-deflection curve that provides clamping force on the tapered roller bearings while encompassing a full range of manufacturing tolerances. A cover plate and top surface of a seal carrier have a geometric configuration that produces an amount of clamping force to eliminate a gap between a seal carrier and each of the tapered roller bearings while also avoiding reducing the life of each of the tapered roller bearings. The desired performance is obtained without adding undue cost, extra parts, or additional package size.

The seal carrier of the attachment assembly has a concave top surface in some arrangements that engages and, under force, causes deflection of the cover plate. In some embodiments of the present invention, the cover plate has a central aperture and a plurality of mounting apertures adjacent an outer edge of the cover plate. To provide the deflection-curve characteristics, the cover plate has a plurality of cut-outs, radial slots, and/or spaced radial slots that form a plurality of fingers. In some arrangements, the cover plate has a plurality of mounting apertures disposed radially about the cover plate and in some embodiments the mounting apertures are positioned in a ring formation with a plurality of spring elements, adapted to twist and bend, that extend inwardly from the ring.

Regardless of the type of shape of cut-out or slot of the present invention, the stiffness of the cover plate is reduced to a desired level and in combination with the shape of the seal carrier, controls the way the cover plate is deformed over the full tolerance range.

DETAILED DESCRIPTION OF THE PREFERRED EMBODIMENTS

Figure 1:
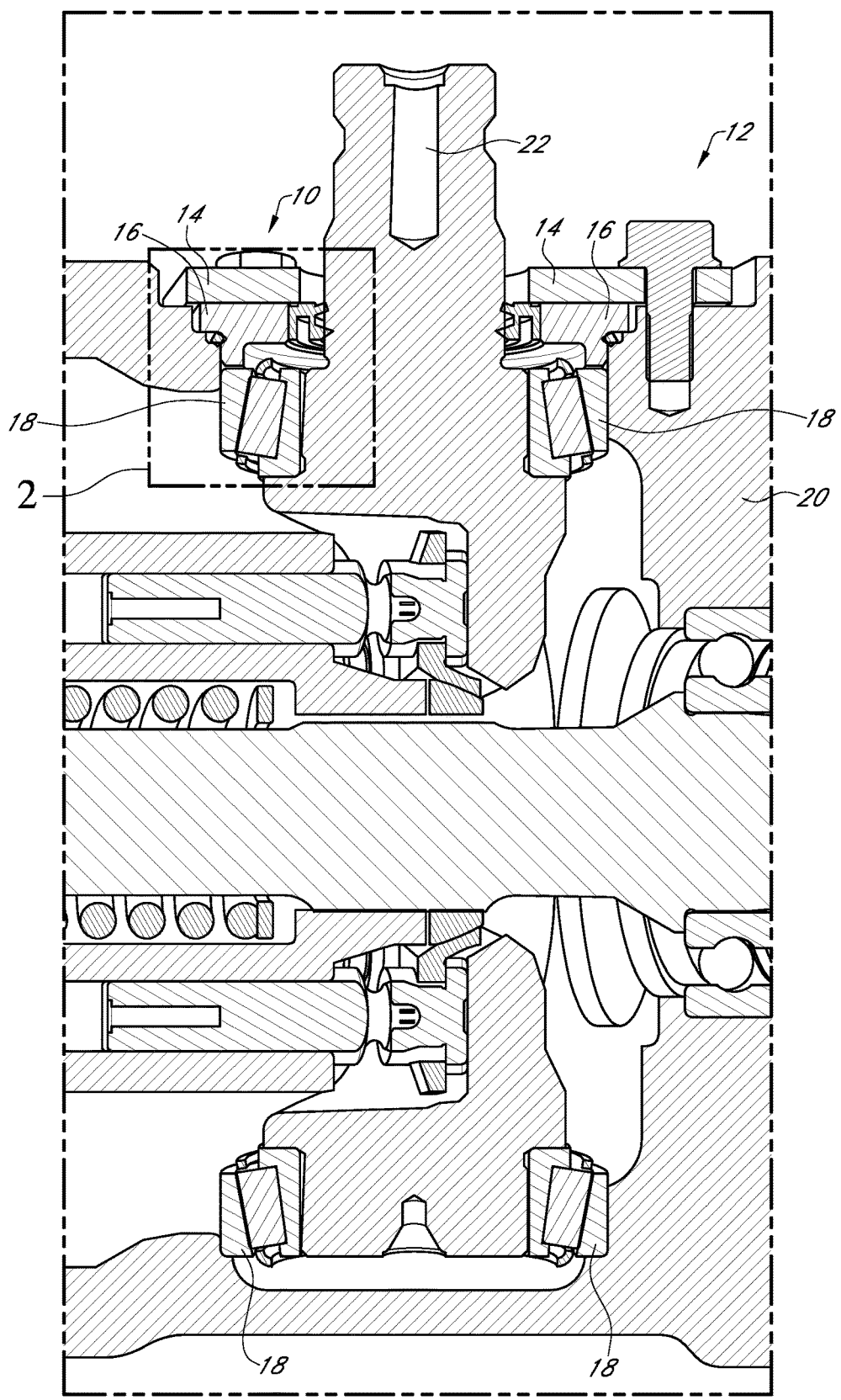
FIG. 1 is a side sectional view of a pump product having tapered roller bearings.
Figure 2:
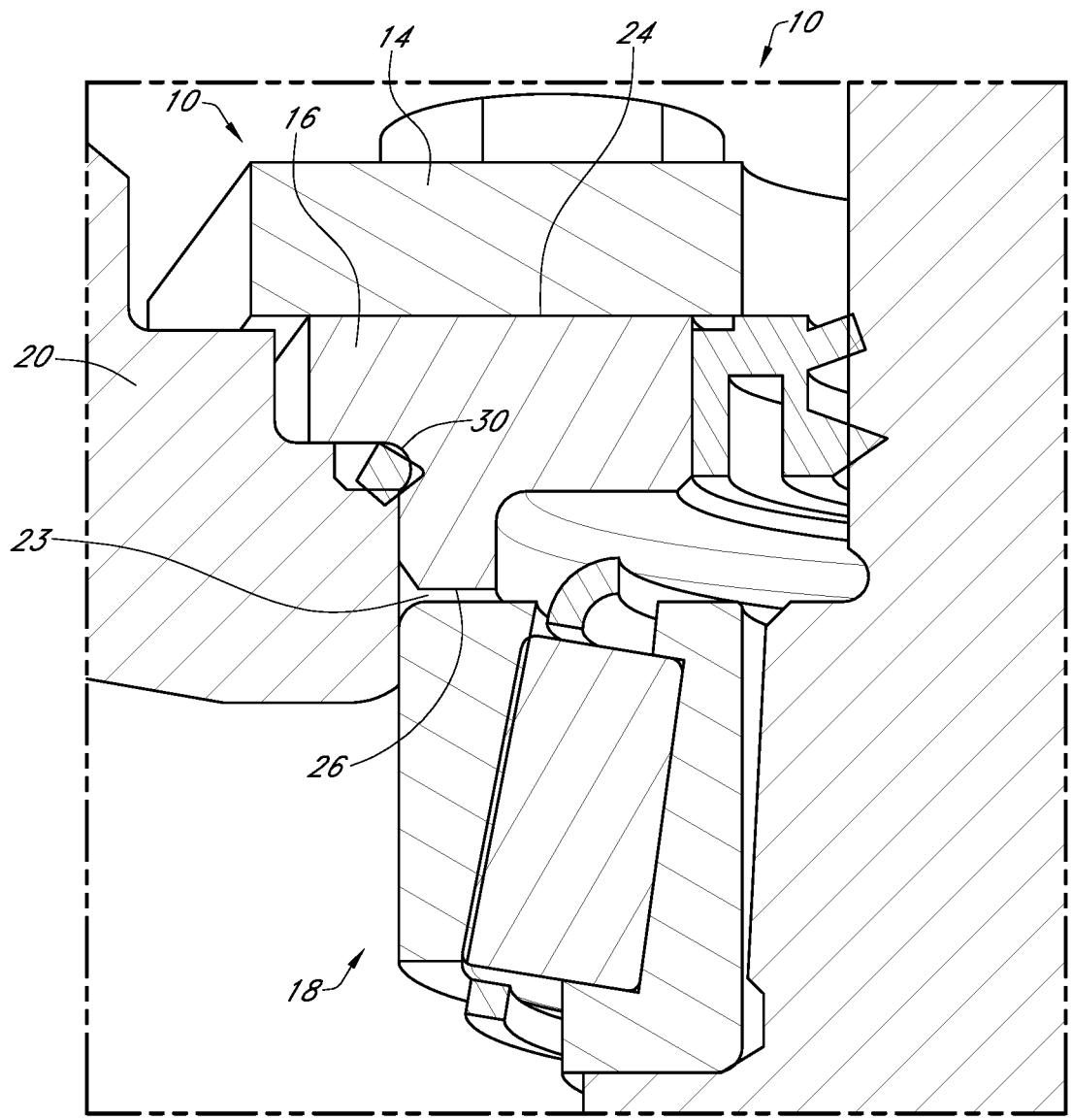
FIG. 2 is a side sectional view of a pump product having tapered roller bearings.

Referring to the Figures, an attachment assembly or system 10 for a pump product 12, such as a hydraulic piston pump or any shaft system that uses a tapered roller bearings 18. The attachment assembly comprises a cover plate 14 and a seal carrier 16. The pump product 12, as seen in FIGS. 1 and 2, comprises at least one tapered roller bearing 18 that is disposed within a housing 20 and is positioned to place an induced thrust load in an axial direction to a shaft 22 being held by the tapered roller bearing 18 when the shaft is under a radial load. The cover plate 14 and the seal carrier 16 in such embodiments are positioned adjacent the tapered roller bearing 18. As also seen in FIG. 2 depicting a prior art pump product 12, there is a gap or space 23 between the seal carrier 16 and the tapered roller bearing 18. The presence of the gap 23 does not provide adequate clamping force to sufficiently constrain the load of the pump product 12 thereby diminishing operation. Alternatively, the tolerance between the seal carrier 16 and the tapered roller bearing 18 is too tight resulting in excessive wear and a reduced life of the tapered roller bearing 18.

Figure 3:
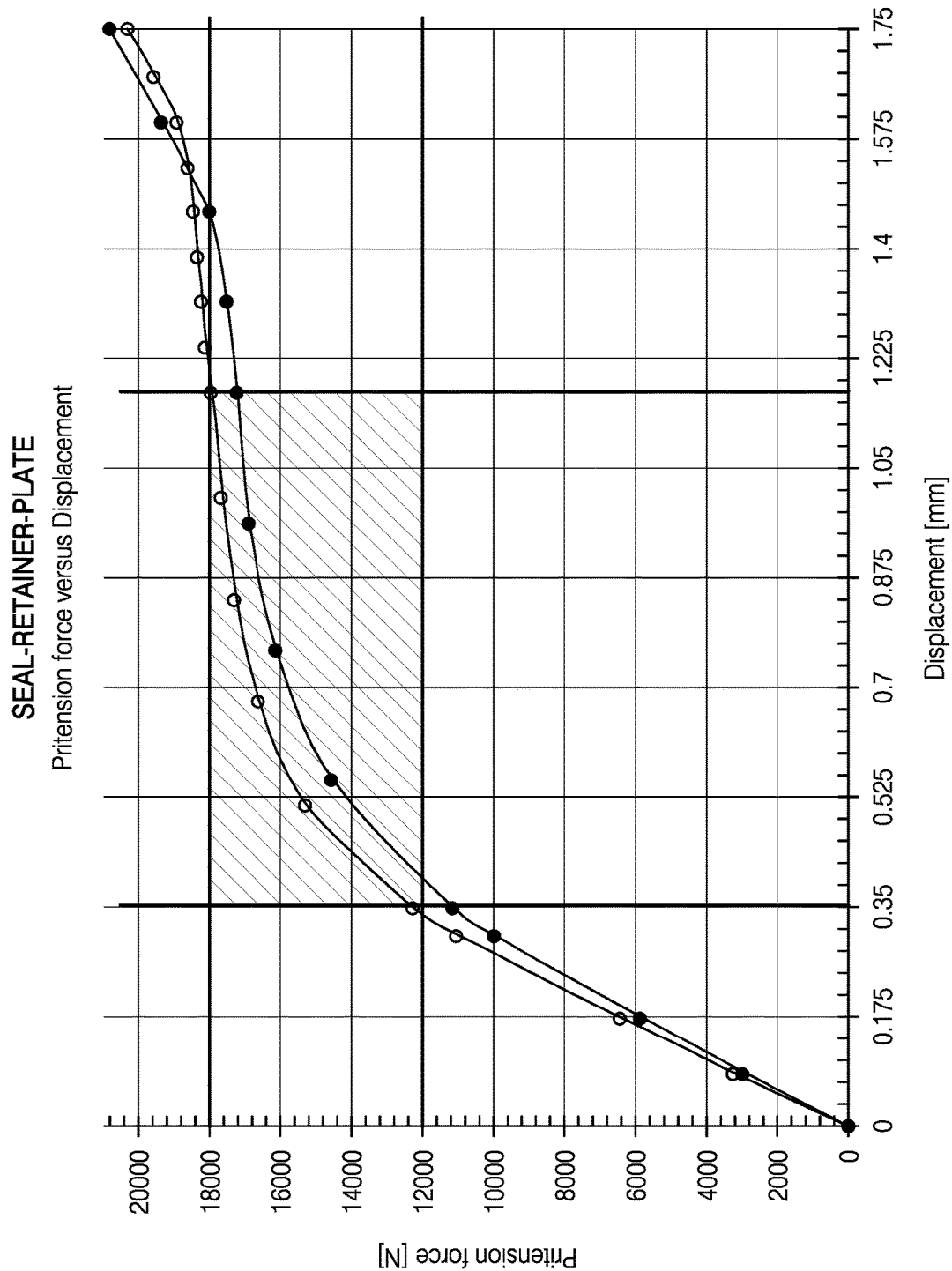
FIG. 3 is a graph showing a force-deflection curve.

According to the present invention, the cover plate 14 and top surface 24 of the seal carrier 16 have unique geometric shapes that provide deflection characteristics that eliminate the gap 23 while avoiding being too tight causing excessive wear. In some embodiments, the unique geometric shapes are derived from simulation techniques, such as Finite Element Analysis (FEA) with non-linear material behavior, thereby the cover plate 14 is configured to produce a force-deflection curve that provides an appropriate amount of clamping force on the tapered roller bearing 18 while at the same time being able to encompass the full manufacturing tolerance range. In particular, the acceptable force-deflection curve for pretension force (N) versus displacement (mm), as shown in the shaded portion of chart depicted in FIG. 3, is between 12,000 to 18,000 N and 0.35 and about 1.159 mm.

With respect to the seal carrier 16, the seal carrier 16 has the top wall or surface 24, a bottom wall or surface 26, and a side wall 28. In some arrangements of the present invention, the side wall 28 is circular and has a central groove 30 that extends around the circumference of the side wall 28. The seal carrier 16 also has a central aperture 32. Preferably, the top surface 24 is at least a partially concave.

In some embodiments, the cover plate 14 is monolithically formed with apertures and cut-outs, and in some particular embodiments is formed from a flat plate of steel with the apertures and shaped cut-outs formed by stamping or laser cut. A thickness 33 of the cover plate 14 is determined by the application and the characteristics of the pump product 12.

Figure 5:
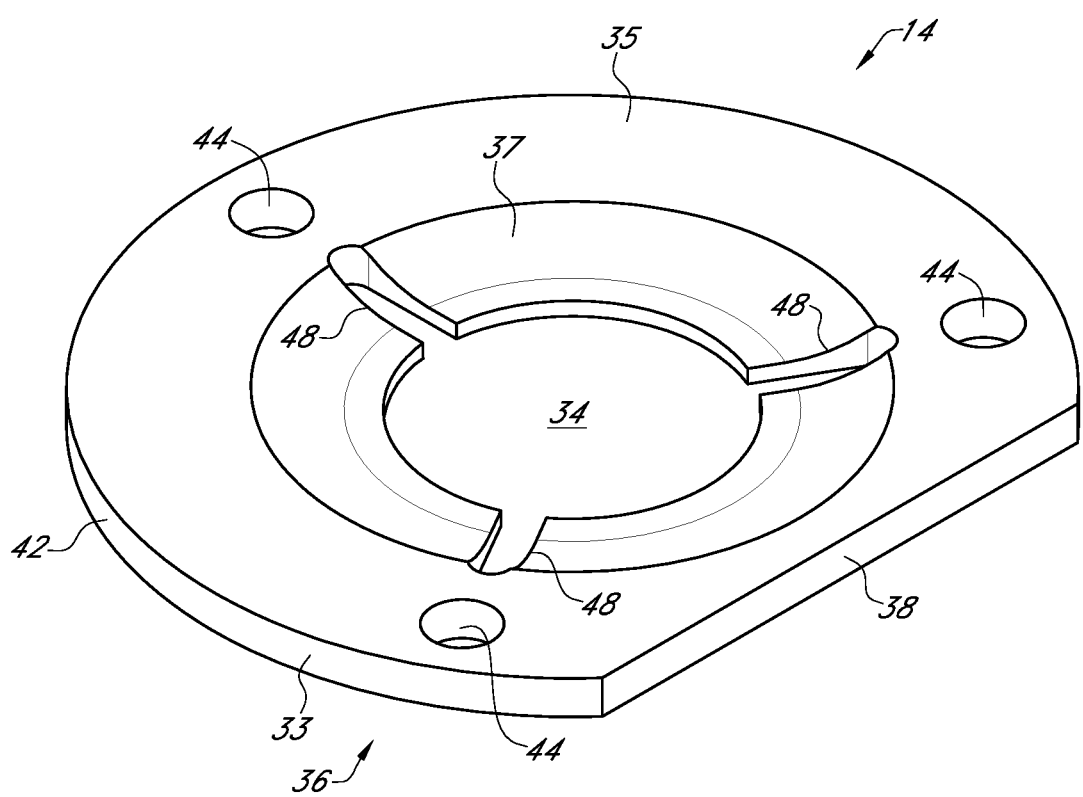
FIG. 5 is a perspective view of a cover plate.
Figure 6:
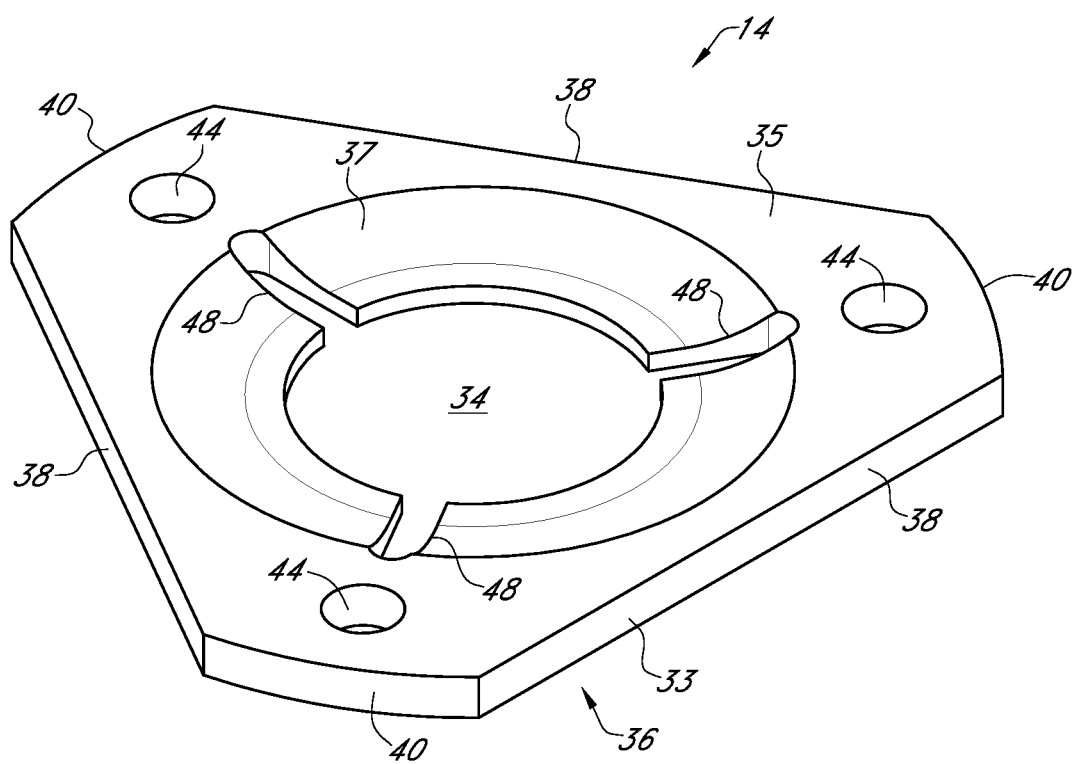
FIG. 6 is a perspective view of a cover plate.
Figure 7:
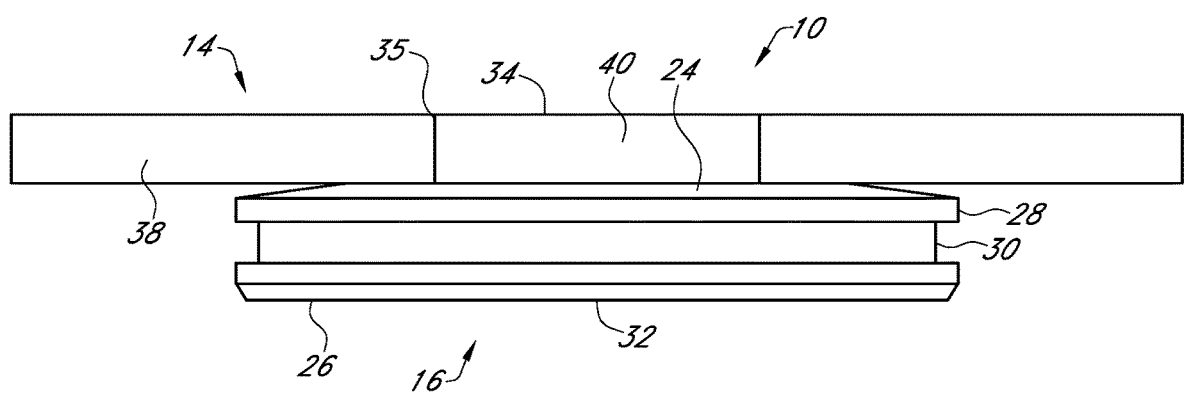
FIG. 7 is a side view of an attachment assembly.
Figure 8:
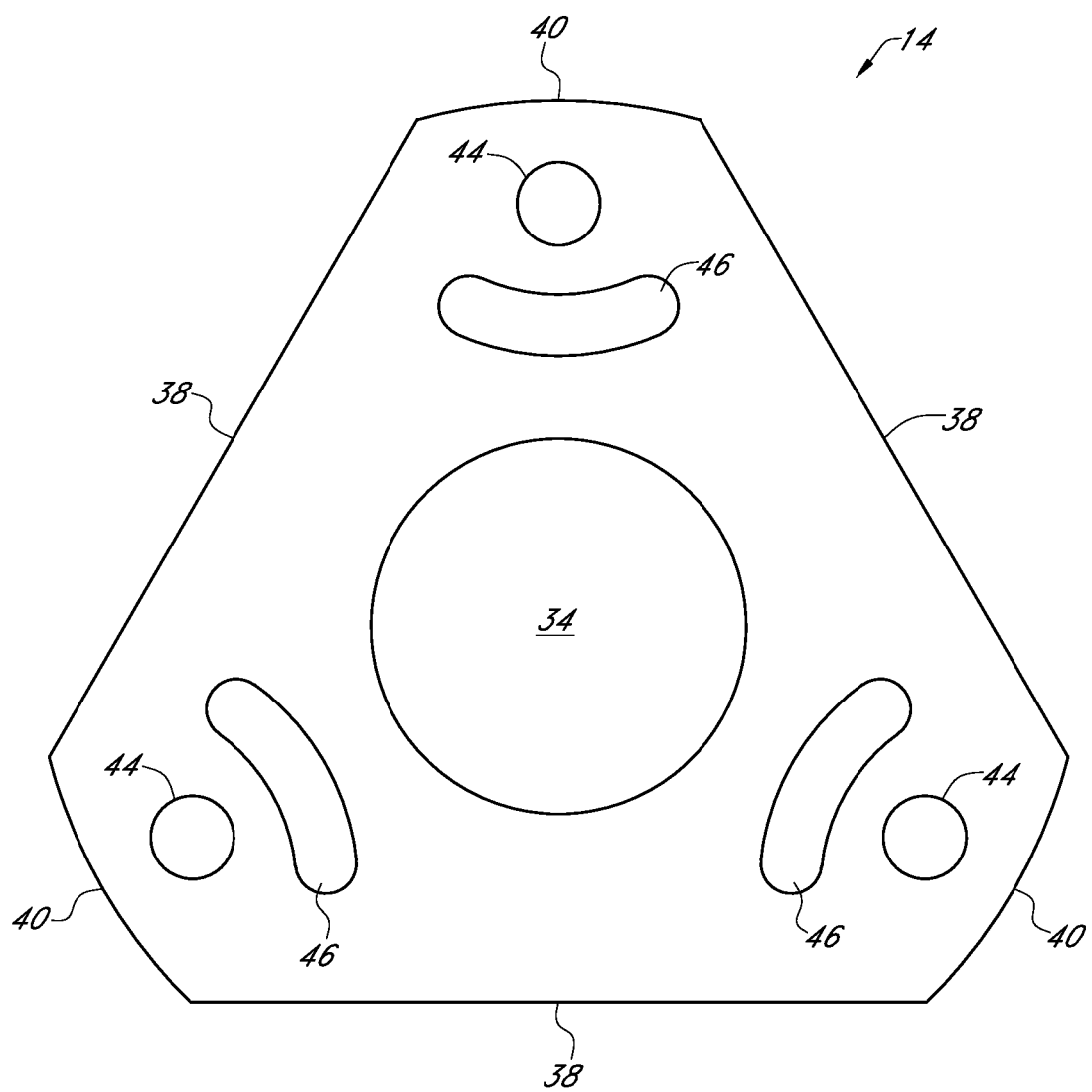
FIG. 8 is a top plan view of a cover plate.

As seen in the exemplary embodiments and with particular reference to the exemplary embodiments depicted in FIGS. 5 and 6, the cover plate 14 also has a central aperture 34 that is formed and configured to align with the central aperture 32 of the seal carrier 16, and has an outer edge 36. In some arrangements, the outer edge 36 is generally triangular in shape comprised of three straight elongated sections 38 connected by or extending between three slightly curved or arcuate mounting sections 40. Alternatively, the outer edge 36 has one elongated, straight section 38 connected to or extending to and from an arcuate section 42. In some embodiments, a top surface 35 of the cover plate 14 has at least a partially concave portion 37. As seen in FIGS. 5 and 6, the partially concave portion 37 extends from the central aperture 34 to the top surface 35 in some arrangements of the present invention.

Adjacent the mounting sections 40 are mounting apertures 44 formed to receive a screw 45 (not shown) that connects the cover plate 14 to the pump product 12. Positioned between the mounting aperture 44 and the central aperture 34 is a cut-out 46. In one example, the cut-out 46 is arcuate and in some arrangements has a concave portion 47 adjacent to the mounting aperture 44, such that in some configurations the cut-out 46 has a kidney-bean shape with the concave portion 47 facing the mounting aperture 44. The position of the cut-out 46 provides flexibility inward of the mounting apertures 44 when the mounting screw 45 is used to secure the cover plate 14 to the pump product while the material under the mounting screw remains flatly engaged against the housing 20. The length and width of the cut-out 46 is adapted to provide the stiffness required to achieve the force-deflection curve attributes.

Figure 4:
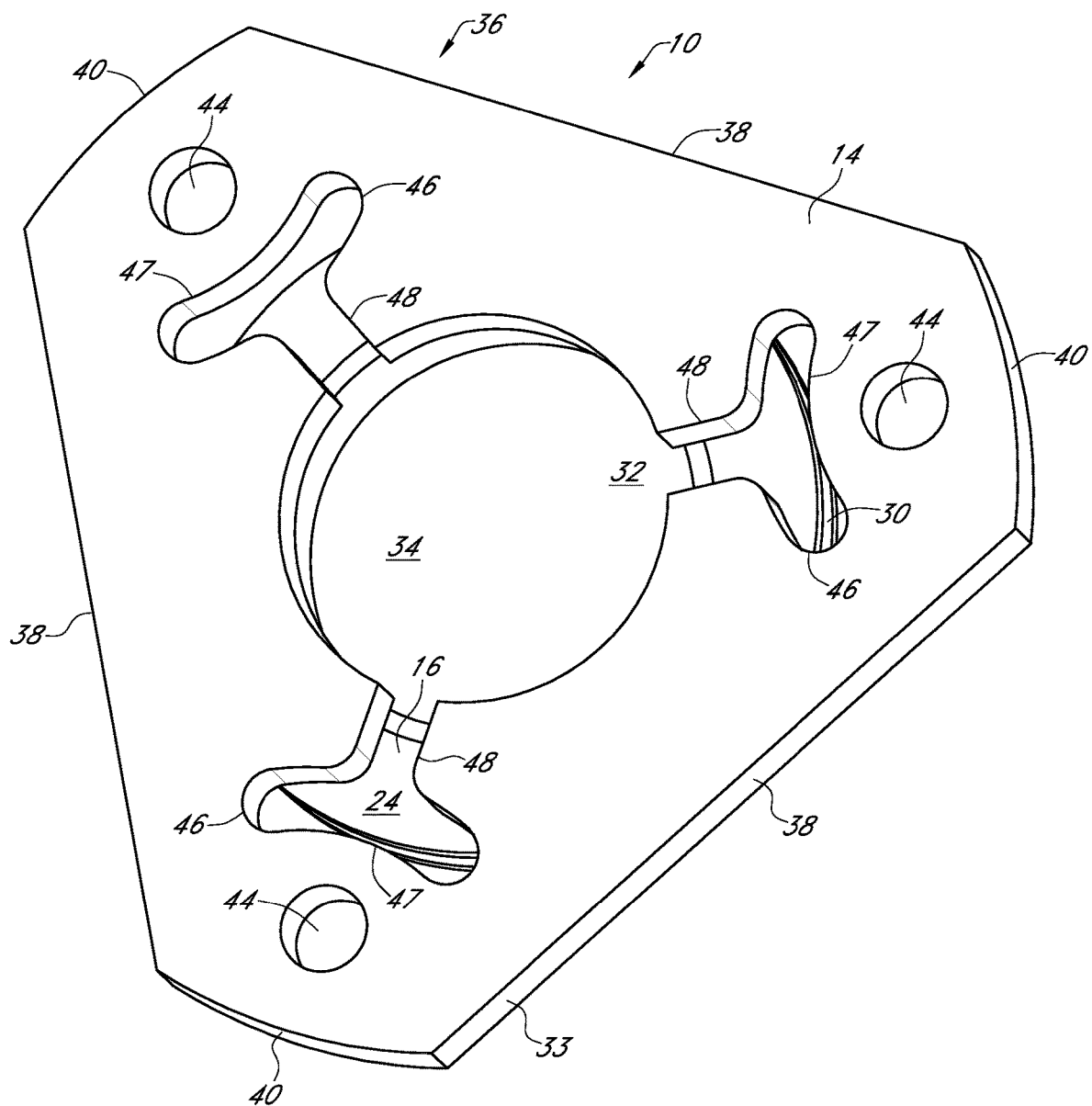
FIG. 4 is a top perspective view of an attachment assembly.

In another example of the present invention and shown in the exemplary embodiment of FIG. 4, radial slots 48 extend from the central aperture 34 to the cut-out 46. In other embodiments and shown in the exemplary embodiment of FIGS. 5 and 6, the radial slot 48 extends from the central aperture 34 toward the mounting aperture 44 and stops before reaching the mounting aperture 44 without the presence of the cut-out 46.

Figure 9:
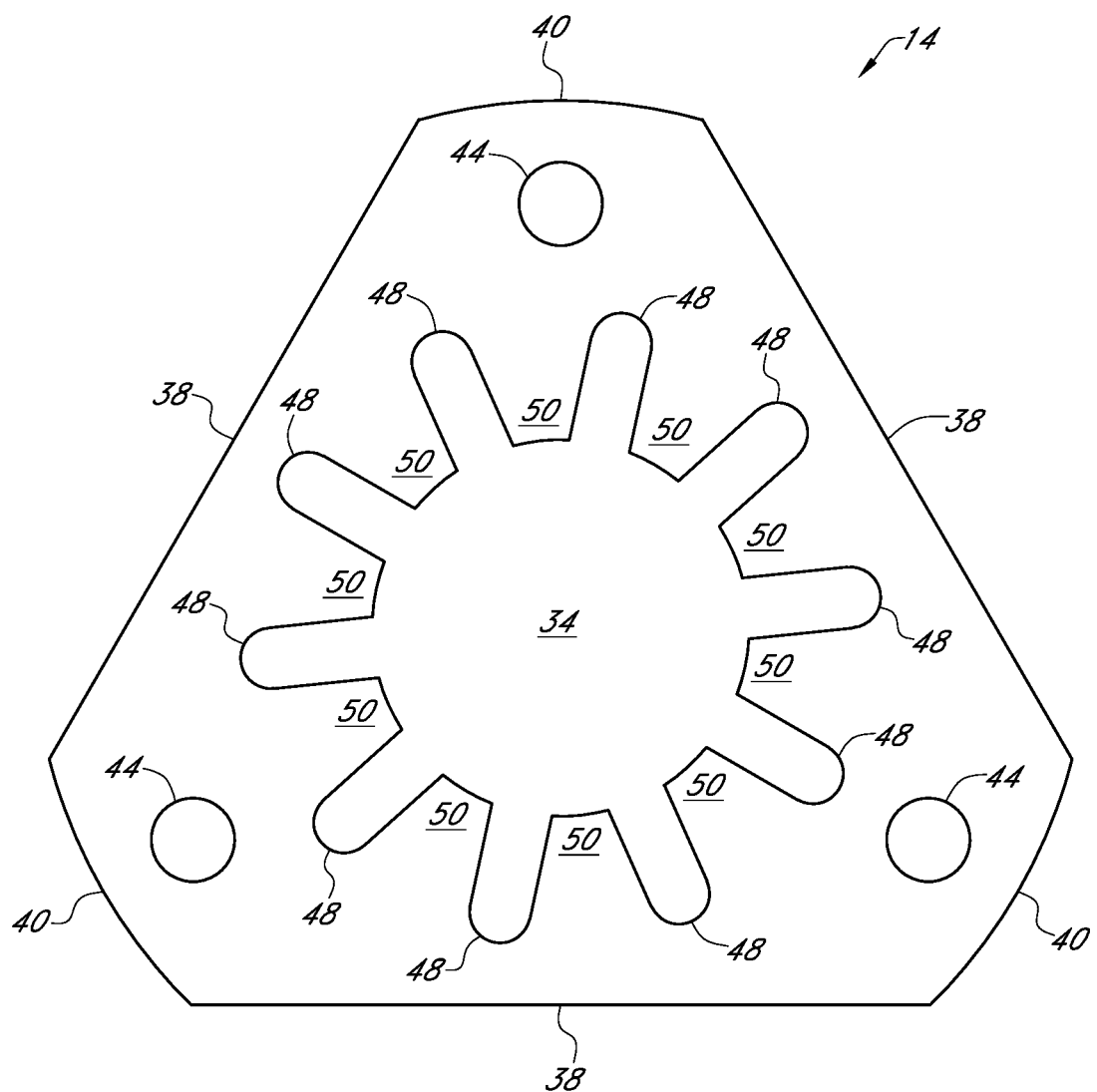
FIG. 9 is a top plan view of a cover plate.

In yet another embodiment and shown in the exemplary embodiment of FIG. 9, the radial slots 48 are positioned in spaced relation from one another and extend partially from the central aperture 34 toward the outer edge 36 of the cover plate 14. The space between the radial slots 48 form a plurality of fingers 50. The number and width of the slots 48 and fingers 50 are adapted to produce the attributes of the force deflection curve. Preferably the fingers 50 are flat and dwell entirely in the same horizontal plane as the cover plate 14. In this configuration, the cover plate 14 is configured to permit installation with either side facing toward the housing 20. Alternatively the fingers 50 are bent, either all the same direction or alternating fingers 50 bent the same direction to reduce the number of active fingers 50 and allow the cover plate 14 to be installed with either side facing the housing 20.

Figure 10:
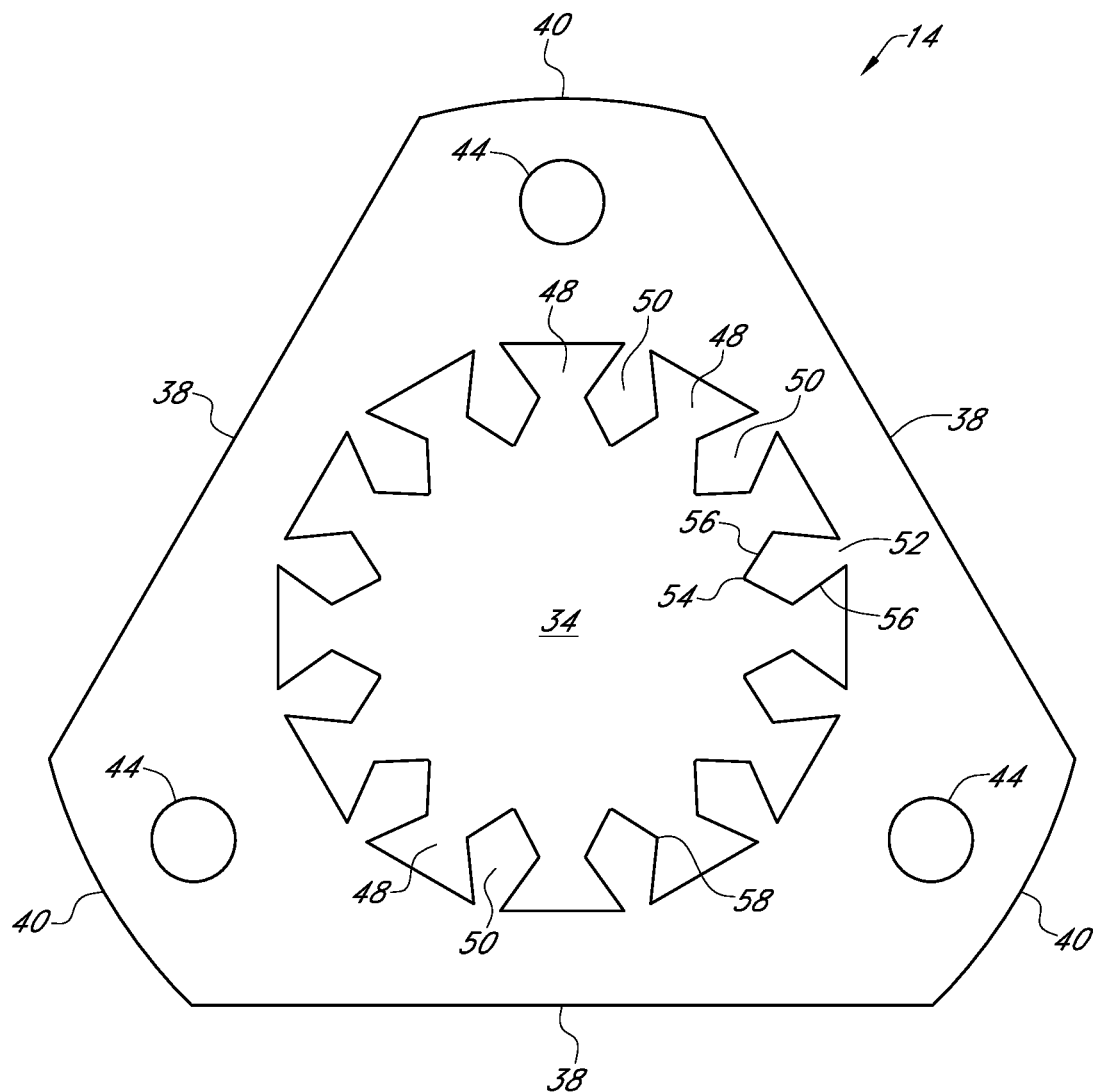
FIG. 10 is a top plan view of a cover plate.

In another embodiment shown in the exemplary embodiment of FIG. 10, the radial slots 48 and fingers 50 are formed in the shape of a nib of a fountain pen tip. More particularly, the fingers 50 have a base 52, a point 54, and a pair of side edges 56 that extend from the base 52 to the point 54. Preferably, the side edges 56 angle outwardly from the base 52 to a transition point 58 and then inwardly from the transition point 58 to the point 54.

Figure 11:
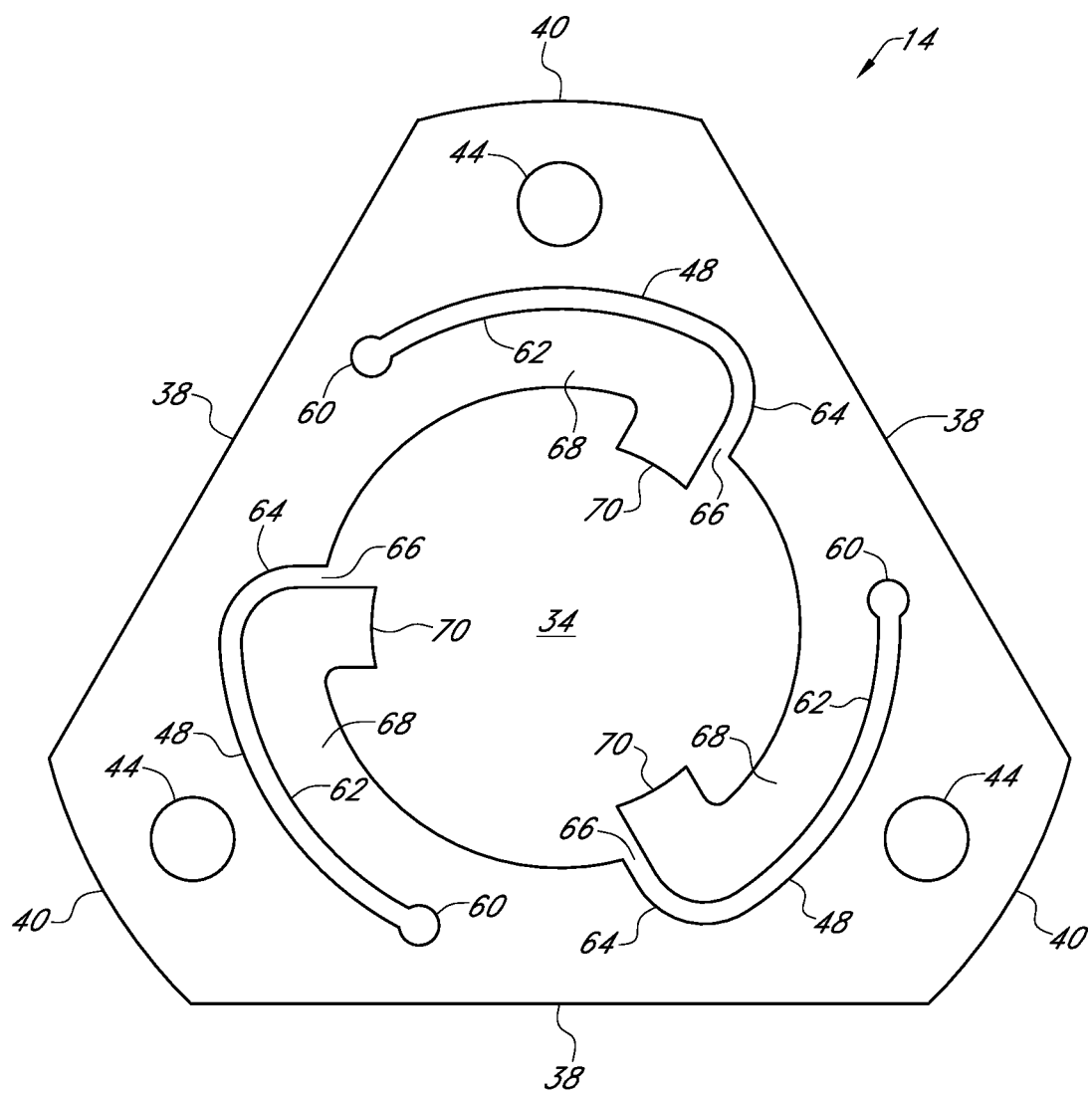
FIG. 11 is a top plan view of a cover plate.

Finally, in embodiment shown in the exemplary embodiment of FIG. 11, the cover plate 14 has a plurality of slots 48 that are J-shaped—similar to a fish hook. The slots 48 have a first end 60 and a first section 62 that extends arcuately in spaced relation to the central aperture 34 from the first end 60. In some embodiments, the first end 60 has a circular or arcuate shape. The first section 62 terminates into a second section 64 that curves from the first section 62 to a second end 66 that is in communication with the central aperture 34. The slots 48 form spring elements 68 positioned between the radial slots 48 and the central aperture 34. The spring elements 68 also have a flange 70 that extends into the central aperture 34. The spring elements 68 are configured to bend and twist during deflection. The length and width of the spring elements 68 are configured to produce the attributes of the force deflection curve.

Figure 12:
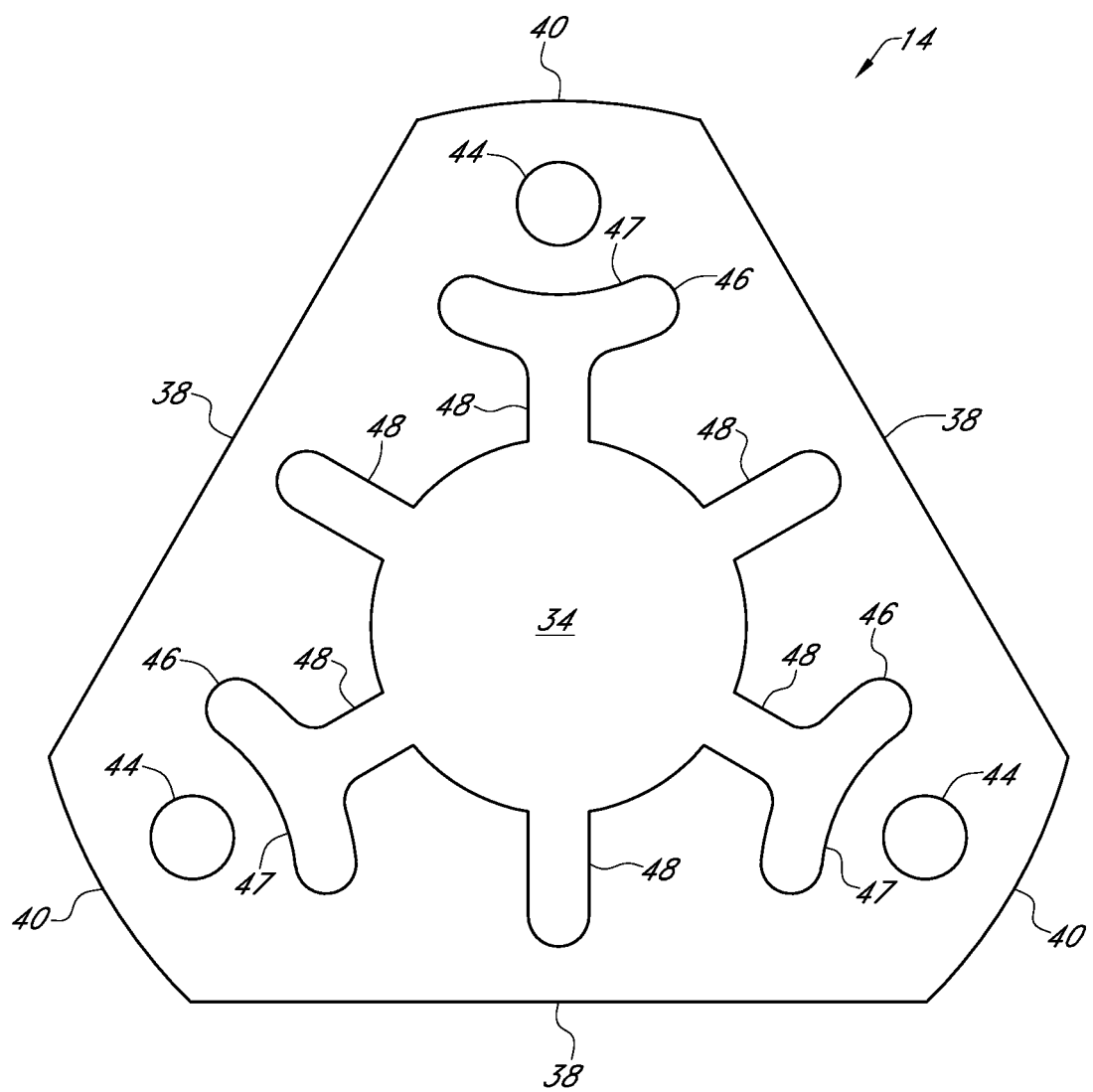
FIG. 12 is a top plan view of a cover plate.

Accordingly, an attachment system for tapered roller bearings in a pump product have been disclosed that provide a clamping force resulting in a tight bearing endplay on the tapered roller bearings through a full range of manufacturing tolerance. From the above discussion and accompanying Figures and claims it will be appreciated that the attachment assembly 10 offers many advantages over the prior art. It will be appreciated further by those skilled in the art that various other modifications could be made to the device without parting from the spirit and scope of this invention, including the combination of the embodiments and exemplary embodiments, such as the exemplary embodiment of FIG. 12. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A bearing attachment system, comprising:
   a pump product having a tapered roller bearing;
   an attachment assembly connected to the pump product and including a seal carrier and a cover plate;
   the cover plate having a central aperture, a plurality of mounting apertures adjacent an outer edge, and a plurality of cut-outs positioned between the central aperture and the plurality of mounting apertures, such that the plurality of cut-outs are not directly connected to the central aperture and the plurality of mounting apertures;
   the cover plate having a first set of radial slots with each of the first set of radial slots extending from the central aperture to one of the plurality of cut-outs;
   a second set of radial slots that extend from the central aperture and do not extend to connect to any of the plurality of cut-outs; and
   wherein the attachment assembly is configured to produce a force deflection having a pretension force between 12,000 N to 18,000 N and displacement between 0.35 and 1.159 mm.

2. The system of claim 1 wherein the plurality of cut-outs are arcuate and concave in relation to the mounting apertures.

3. The system of claim 1 wherein a plurality of radial slots extend from the central aperture toward the plurality of mounting apertures and terminate prior to the mounting apertures.

4. The system of claim 1 wherein a top surface of the seal carrier is concave and a sidewall of the seal carrier has a central groove that extends around the circumference of the side wall.

5. The system of claim 1 further comprising the cover plate having a partially concave portion that extends from the central aperture to a top surface of the cover plate.

6. They system of claim 5 wherein a plurality of radial slots extend from the central aperture and beyond the partially concave portion.

7. The system of claim 1 further comprising an outer edge of the cover plate comprising three straight elongated sections connected to one another by three arcuate sections.

8. The system of claim 1 further comprising an outer edge of the cover plate consisting of an elongated straight section extending to and from a circular section.

9. A bearing attachment system, comprising:
   a pump product having a tapered roller bearing;
   an attachment assembly connected to the pump product and including a seal carrier and a cover plate;
   the cover plate has a plurality of slots having a first section and a second section, wherein the first section extends from an end to the second section and the second section extends from the first section to a central aperture, wherein the central aperture is circular; and
   a plurality of spring elements formed between the plurality of slots and the central aperture, wherein the spring elements have a flange that extends into the central aperture, wherein the plurality of spring elements are configured to bend and twist during deflection.

10. The system of claim 9 wherein the first section and the second section have an arcuate shape.

11. The system of claim 9 wherein the first section is circular at the end.

12. The system of claim 9 wherein the first section is arcuate at the end.

13. A bearing attachment system, comprising:
    a pump product having a tapered roller bearing;
    an attachment assembly connected to the pump product and including a seal carrier and a cover plate;
    the cover plate having a partially concave portion that extends outwardly from a central aperture, between a top surface and a bottom surface of the cover plate, and upwardly to the top surface of the cover plate, wherein the central aperture extends through the top surface and the bottom surface of the cover plate;
    a plurality of mounting apertures adjacent an outer edge, and a plurality of radial slots that extend from the central aperture and beyond the partially concave portion.

14. A bearing attachment system, comprising:
    a pump product having a tapered roller bearing;
    an attachment assembly connected to the pump product and including a seal carrier and a cover plate;
    the cover plate having a plurality of radial slots in spaced relation extend partially from a central aperture toward an outer edge of the cover plate to form a plurality of fingers between the plurality of radial slots;
    the plurality of fingers each have a base, a point, and side edges that extend between the base and the point;

wherein the side edges angle outwardly from the base to a transition point and then inwardly from the transition point to the point; and wherein the attachment assembly is configured to produce a force deflection having a pretension force between 12,000 N to 18,000 N and displacement between 0.35 and 1.159 mm.

15. A bearing attachment system, comprising:

a pump product having a tapered roller bearing;

an attachment assembly connected to the pump product and including a seal carrier and a cover plate;

the cover plate having a central aperture, a plurality of mounting apertures adjacent an outer edge, and a plurality of cut-outs positioned between the central aperture and the plurality of mounting apertures, such that the plurality of cut-outs are not directly connected to the central aperture and the plurality of mounting apertures; and the cover plate having a partially concave portion that extends from the central aperture to a top surface of the cover plate.

* * * * *